United States Patent
Tan et al.

(10) Patent No.: US 9,652,150 B2
(45) Date of Patent: May 16, 2017

(54) GLOBAL MEMORY SHARING METHOD AND APPARATUS, AND COMMUNICATIONS SYSTEM

(71) Applicant: Huawei Technologies Co., Ltd., Shenzhen (CN)

(72) Inventors: Chongkang Tan, Beijing (CN); Gang Lu, Beijing (CN); Jianfeng Zhan, Beijing (CN); Lixin Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 132 days.

(21) Appl. No.: 14/739,497

(22) Filed: Jun. 15, 2015

(65) Prior Publication Data
US 2015/0277772 A1    Oct. 1, 2015

Related U.S. Application Data

(63) Continuation of application No. PCT/CN2013/083704, filed on Sep. 18, 2013.

(30) Foreign Application Priority Data

Dec. 17, 2012   (CN) .......................... 2012 1 0548012

(51) Int. Cl.
G06F 12/10   (2016.01)
G06F 3/06    (2006.01)
(Continued)

(52) U.S. Cl.
CPC .......... G06F 3/0604 (2013.01); G06F 3/0631 (2013.01); G06F 3/0683 (2013.01);
(Continued)

(58) Field of Classification Search
CPC ......... G06F 3/0604; G06F 3/067; G06F 12/08
See application file for complete search history.

(56) References Cited

U.S. PATENT DOCUMENTS

| 5,754,854 A | 5/1998 | Kanamori et al. |
| 2005/0108496 A1 | 5/2005 | Elnozahy et al. |

(Continued)

FOREIGN PATENT DOCUMENTS

| CN | 1617113 A | 5/2005 |
| CN | 101246466 A | 8/2008 |

(Continued)

OTHER PUBLICATIONS

Foreign Communication From a Counterpart Application, European Application No. 13865932.1, Extended European Search Report dated May 10, 2016, 11 pages.

(Continued)

*Primary Examiner* — Jae Yu
(74) *Attorney, Agent, or Firm* — Conley Rose, P.C.

(57) ABSTRACT

A global memory sharing method includes counting, by the sub-operating system, a page replacement rate in a task scheduling period of a predetermined quantity of times, and a memory residence time ratio in a page replacement period; calculating, by the sub-operating system, a memory pressure index according to the page replacement rate and the memory residence time ratio; and if the memory pressure index is greater than a memory pressure threshold, sending, by the sub-operating system, an application to a global memory management service module. According to the forgoing method, in an architecture of multiple operating systems, each sub-operating system can complete much adaptive work, which reduces complexity of the global memory management service module and improves system performance. Meanwhile, a utilization rate of global (Continued)

memory may be improved, and the architecture of the multiple operating systems may have better extensibility.

17 Claims, 12 Drawing Sheets

(51) Int. Cl.
*G06F 9/50* (2006.01)
*G06F 12/08* (2016.01)

(52) U.S. Cl.
CPC .............. *G06F 9/50* (2013.01); *G06F 9/5016* (2013.01); *G06F 12/08* (2013.01)

(56) References Cited

U.S. PATENT DOCUMENTS

| | | | |
|---|---|---|---|
| 2006/0275934 A1 | 12/2006 | Pohl et al. | |
| 2011/0125812 A1* | 5/2011 | Kandasamy | ........ G06F 9/45537 707/813 |
| 2012/0317331 A1 | 12/2012 | Broas | |

FOREIGN PATENT DOCUMENTS

| | | |
|---|---|---|
| CN | 102306125 A | 1/2012 |
| CN | 102306126 A | 1/2012 |
| WO | 9941668 A1 | 8/1999 |

OTHER PUBLICATIONS

Partial English Translation and Abstract of Chinese Patent Application No. CN102306126A, Jun. 10, 2015, 6 pages.
Foreign Communication From a Counterpart Application, PCT Application No. PCT/CN2013/083704, English Translation of International Search Report dated Dec. 26, 2013, 2 pages.
Foreign Communication From a Counterpart Application, PCT Application No. PCT/CN2013/083704, English Translation of Written Opinion dated Dec. 26, 2013, 6 pages.
Foreign Communication From a Counterpart Application, European Application No. 13865932.1, European Search Report dated Mar. 7, 2016, 10 pages.
Partial English Translation and Abstract of Chinese Patent Application No. CN102306125, Jan. 4, 2012, 5 pages.
Foreign Communication From A Counterpart Application, Chinese Application No. 201210548012.9, Chinese Office Action dated Feb. 3, 2017, 6 pages.

* cited by examiner

GLOBAL MEMORY SHARING METHOD AND APPARATUS, AND COMMUNICATIONS SYSTEM

CROSS-REFERENCE TO RELATED APPLICATIONS

This application is a continuation of International Application No. PCT/CN2013/083704, filed on Sep. 18, 2013, which claims priority to Chinese Patent Application No. 201210548012.9, filed on Dec. 17, 2012, both of which are hereby incorporated by reference in their entireties.

TECHNICAL FIELD

The present invention relates to the communications field, and in particular, to a global memory sharing method and apparatus and a communications system.

BACKGROUND

As a data volume and a requirement for data processing greatly increase, a load imposes a higher requirement on performance of an operating system, and an operating system with a structure of a microkernel and multikernel has become a trend in developing an operating system in future. Multikernel cooperative work can better isolate applications, improve a throughput rate of a system, and greatly improve performance of the system. Therefore, in the age of big data processing, various multikernel systems (or multiple operating systems) also gradually have drawn people's attention, and systems ranging from a conventional computer cluster system to a heterogeneous operating system that is popular nowadays are people's attempts in this aspect.

A main idea of a structure of multiple operating systems is that, by using this manner, different loads can be allocated to different operating system kernels for execution, so that a processing capability of the system can be improved and applications in different operating systems can be compatible. Compared with a conventional structure of multiple operating systems that is based on a computer cluster, a granularity of current multiple operating systems is degraded from an operating system to an operating system kernel. However, a design idea of separating calculation and resource sharing is still not changed. In other words, by using this design, all kernels are independent in terms of calculation, that is, all kernels independently process loads. However, in terms of use of resources, operating systems share resources of an entire structure of multiple operating systems, for example, input/output (I/O), and memory.

For memory that is a resource of a structure of multiple operating systems, existing structures of multiple operating systems mainly use a global memory sharing manner, that is, each central processing unit (CPU) runs a sub-operating system that is independent of each other; each sub-operating system accesses a global memory pool by using a Peripheral Component Interconnect Express (PCIe) bus or a network; and for the entire multiple operating systems, a global memory management service module that is responsible for coordinating a situation that sub-operating systems occupy global memory exists.

For a situation of sharing of global memory, policies used by various structures of multiple operating systems are different. A kind of typical design in the prior art is that: if the global memory is abstracted as a "memory stripe", a global memory management service module system or module allocates, in a fixed sequence, from the front to the back, memory of the "memory stripe" in a basic unit of a quantity of blocks to kernel sections of sub-operating systems, that is, a sequence of occupying memory by the kernel sections of the sub-operating systems is arranged from the front to the back, and memory allocated to the kernel sections keeps unchanged in a running process of the entire multiple operating systems. General sections of the sub-operating systems obtain memory of the "memory stripe", where the memory of the "memory stripe" is allocated from the back to the front by the global memory management service module system or module. A difference from allocation of memory to the kernel sections lies in that, allocation of memory to the general sections is dynamic allocation, and there is no sequence between pages that belong to each sub-operating system.

The foregoing conventional structure of the multiple operating systems that uses the global memory sharing manner has the following disadvantage. Each sub-operating system lacks a capability of actively sensing memory, and all global memory management work is processed by a global memory management service module, thereby causing complex encoding of global memory management and low execution efficiency, and also affecting performance of an entire system.

SUMMARY

Embodiments of the present invention provide a global memory sharing method and apparatus and a communications system, so as to improve autonomy of a sub-operating system and reduce pressure on a global memory management service module.

An embodiment of the present invention provides a global memory sharing method, where the method includes counting, by a sub-operating system, a page replacement rate in a task scheduling period of a predetermined quantity of times, and a memory residence time ratio in a page replacement period; calculating, by the sub-operating system, a memory pressure index according to the page replacement rate and the memory residence time ratio; and if the memory pressure index is greater than a memory pressure threshold, sending, by the sub-operating system, an application to a global memory management service module, where the application is used for applying for allocation of currently acquirable memory from global sharing memory.

Another embodiment of the present invention provides a global memory sharing method, where the method includes receiving, by a global memory management service module, an application that is used for allocating currently acquirable memory from global sharing memory and is sent by a sub-operating system; marking, by the global memory management service module, an allocatable memory block in a global free memory queue as an unavailable state, and sending a memory allocation message to the sub-operating system, where the memory allocation message carries a description message of the allocatable memory block; receiving, by the global memory management service module, an update confirmation message returned by the sub-operating system; deleting, by the global memory management service module according to the update confirmation message, the memory block that is marked as the unavailable state from the global free memory queue; and sending, by the global memory management service module, a message in response to the update confirmation message to the sub-operating system.

An embodiment of the present invention provides a global memory sharing apparatus, where the apparatus includes a counting module configured to count a page replacement rate in a task scheduling period of a predetermined quantity of times, and a memory residence time ratio in a page replacement period; a calculating module configured to calculate a memory pressure index according to the page replacement rate and the memory residence time ratio; and a memory applying module configured to, when the memory pressure index is greater than a memory pressure threshold, send an application to a global memory management service module, where the application is used for applying for allocation of currently acquirable memory from global sharing memory.

Another embodiment of the present invention provides a global memory sharing apparatus, where the apparatus includes an application receiving module configured to receive an application that is used for allocating currently acquirable memory from global sharing memory and is sent by a sub-operating system; a free memory processing module configured to mark an allocatable memory block in a global free memory queue as an unavailable state, and send a memory allocation message to the sub-operating system, where the memory allocation message carries a description message of allocatable memory block; a first message receiving module configured to receive an update confirmation message returned by the sub-operating system; a memory deleting module configured to delete, according to the update confirmation message, the memory block that is marked as the unavailable state from the global free memory queue; and a response message sending module configured to send a message in response to the update confirmation message to the sub-operating system.

An embodiment of the present invention provides a communications system, where the system includes a global memory management service subsystem and at least one sub-operating system, where the global memory management service subsystem includes an application receiving module, a free memory processing module, a first message receiving module, a memory deleting module, and a response message sending module, and the sub-operating system includes a counting module, a calculating module, and a memory applying module, where the counting module is configured to count a page replacement rate in a task scheduling period of a predetermined quantity of times, and a memory residence time ratio in a page replacement period; the calculating module is configured to calculate a memory pressure index according to the page replacement rate and the memory residence time ratio; the memory applying module is configured to, when the memory pressure index is greater than a memory pressure threshold, send an application to a global memory management service module, so as to allocate currently acquirable memory from global sharing memory; the application receiving module is configured to receive the application that is used for allocating the currently acquirable memory from the global sharing memory and is sent by the sub-operating system; the free memory processing module is configured to mark an allocatable memory block in a global free memory queue as an unavailable state, and send a memory allocation message to the sub-operating system, where the memory allocation message carries a description message of the allocatable memory block; the first message receiving module is configured to receive an update confirmation message returned by the sub-operating system; the memory deleting module is configured to delete, according to the update confirmation message, the memory block that is marked as the unavailable state from the global free memory queue; and the response message sending module is configured to send a message in response to the update confirmation message to the sub-operating system.

It may be learned from the foregoing embodiments of the present invention that, each sub-operating system in multiple operating systems determines, according to a value relationship between a memory pressure index of the sub-operating system and a memory pressure threshold, whether to send, to a global memory management service module, a request for applying for memory. Therefore, according to the method provided in the embodiments of the present invention, in an architecture of the multiple operating systems, each sub-operating system can complete much adaptive work, which reduces complexity of the global memory management service module and improves system performance. Meanwhile, because the sub-operating systems can independently complete work of applying for and releasing memory, a utilization rate of global memory may be improved, and the architecture of the multiple operating systems may have better extensibility.

BRIEF DESCRIPTION OF THE DRAWINGS

To describe the technical solutions in the embodiments of the present invention more clearly, the following briefly introduces the accompanying drawings required for describing the embodiments. The accompanying drawings in the following description show merely some embodiments of the present invention, and a person skilled in the art may still derive other drawings from these accompanying drawings.

DETAILED DESCRIPTION

The following clearly describes the technical solutions in the embodiments of the present invention with reference to the accompanying drawings in the embodiments of the present invention. The described embodiments are merely some but not all of the embodiments of the present invention. All other embodiments obtained by a person skilled in the art based on the embodiments of the present invention shall fall within the protection scope of the present invention.

Figure 1:
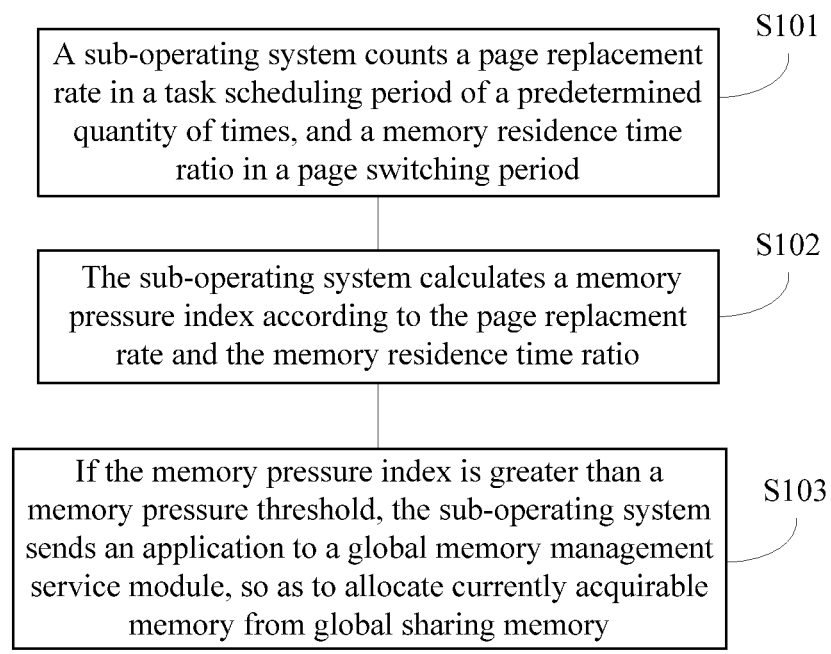
FIG. 1 is a schematic flowchart of a global memory sharing method according to an embodiment of the present invention.

Referring to FIG. 1, FIG. 1 is a schematic flowchart of a global memory sharing method according to an embodiment of the present invention. The method may be executed by any sub-operating system in an architecture of multiple operating systems, and the method mainly includes step S101, step S102, and step S103.

S101. A sub-operating system counts a page replacement rate in a task scheduling period of a predetermined quantity of times, and a memory residence time ratio in a page replacement period.

In this embodiment of the present invention, the sub-operating system is any operating system for constituting an architecture of multiple operating systems, and each sub-operating system includes a local memory management service (LMMS) module and a heartbeat (HB) module, where the LMMS module is responsible for managing memory of a sub-operating system to which the LMMS module belongs, and the HB module provides a heartbeat mechanism and is responsible for providing, for a management operating system, "heartbeat" information and other information that are used to indicate that the sub-operating system is running.

Each sub-operating system uses a variable to record a quantity of page swap-out times in a task scheduling period of a predetermined quantity of times, and the variable that is used to record the quantity of page swap-out times increases in each page replacement period. As an embodiment in which a page replacement rate in a task scheduling period of a predetermined quantity of times is counted, the sub-operating system may count a quantity of page swap-out times in the task scheduling period of a predetermined quantity of times, and after the quantity of page swap-out times in the task scheduling period is counted, it is not difficult to obtain a total quantity of replaced pages (marked as R) in this period. In an operating system, a total quantity of physical pages (marked as P) is known; therefore, a ratio R/P of a total quantity of replaced pages in the task scheduling period to a quantity of physical pages may be obtained by means of calculation, and the ratio is used as the page replacement rate in the task scheduling period of a predetermined quantity of times. For ease of description, the page replacement rate in the task scheduling period of a predetermined quantity of times is marked as PRR, and then PRR=R/P.

In the architecture of the multiple operating systems, each sub-operating system further uses a variable TRmin to record a minimum residence time of a page in memory. A residence time (marked as TR) of a page in memory may be expressed by a difference between a current time stamp Tc and a page swap-in time stamp Ti, that is: memory residence time TR=current time stamp Tc−page swap-in time stamp Ti.

In each page replacement period, the sub-operating system calculates a memory residence time of a current swap-out page. If a current memory residence time is less than a previous memory residence time, the current memory residence time is used as a minimum memory residence time TRmin, and if the current memory residence time is greater than the previous memory residence time, the previous memory residence time is used as the minimum memory residence time TRmin. After the sub-operating system counts the minimum memory residence time TRmin, a ratio of the minimum memory residence time TRmin to a memory residence time threshold Tt may be used as a memory residence time ratio (marked as TP), that is, TP=TRmin/Tt. In this embodiment of the present invention, the memory residence time ratio TP is one of parameters for measuring a memory pressure index of a sub-operating system in the architecture of the multiple operating systems.

S102. The sub-operating system calculates a memory pressure index according to the page replacement rate and the memory residence time ratio.

A specific calculating method may be calculating a linear combination a×PRR+b×TP of the page replacement rate PRR in the task scheduling period of a predetermined quantity of times, and the memory residence time ratio TP, and using a×PRR+b×TP as a memory pressure index P1, where a and b are ratio adjustment parameters of the page replacement rate and the memory residence time ratio in the linear combination a×PRR+b×TP, PRR is the page replacement rate in the task scheduling period of a predetermined quantity of times, and TP is the memory residence time ratio.

S103. If the memory pressure index is greater than a memory pressure threshold, the sub-operating system sends an application to a global memory management service module, where the application is used for the global memory management service module to allocate currently acquirable memory from global sharing memory to the sub-operating system.

Figure 2:
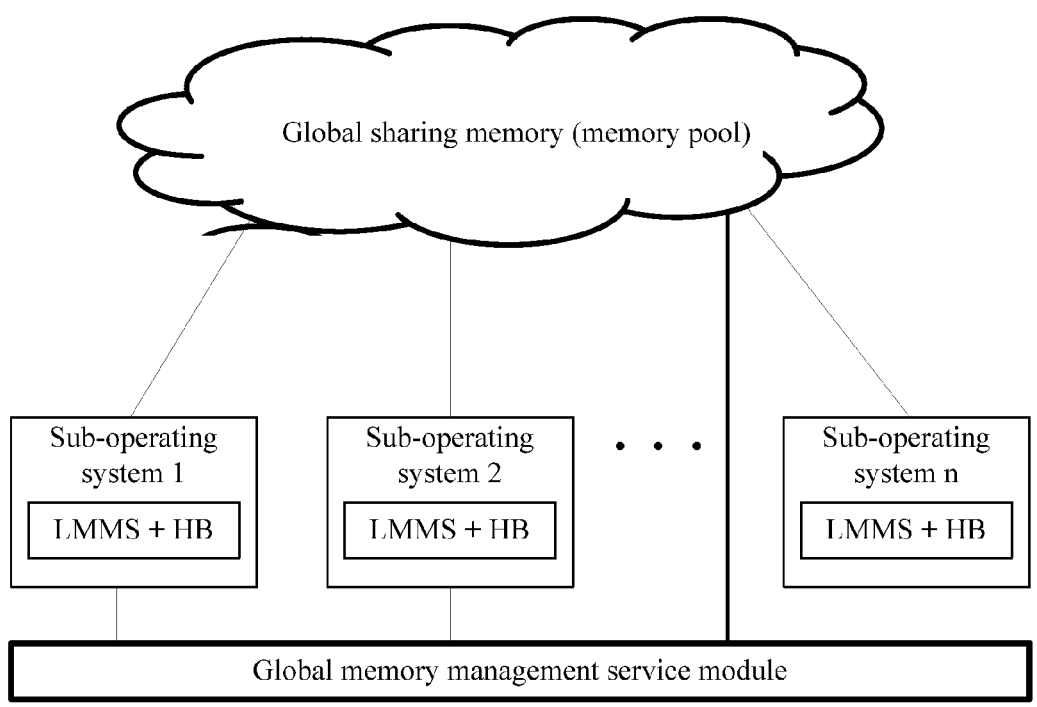
FIG. 2 is a schematic diagram of an architecture of multiple operating systems including global sharing memory according to an embodiment of the present invention.

In this embodiment of the present invention, the global memory management service module (GMMS) is a memory management service module or subsystem that is in the architecture of the multiple operating systems and runs in the management operating system, and is responsible for coordinating a situation that each sub-operating system uses global memory, for example, allocating basic running memory to each sub-operating system, and re-allocating memory to a sub-operating system and releasing memory according to an application of the sub-operating system in a process in which the sub-operating system runs. The global sharing memory may be merely a memory array, or may be a memory pool formed by connecting multiple memory arrays through a PCIe interface or another interface. As shown in FIG. 2, FIG. 2 is a schematic diagram of an architecture of multiple operating systems including global sharing memory according to an embodiment of the present invention. Data of all sub-operating systems is placed in different areas of the global sharing memory, and when a sub-operating system starts, the global memory management service module allocates basic running memory to the sub-operating system. Then, the sub-operating system may dynamically apply for or release memory when running, and the global memory management service module allocates, in a unit of block, memory in different areas to different sub-operating systems.

The memory pressure threshold is marked as Pr. In step S102, when the memory pressure index P1 obtained by means of calculation by the sub-operating system is greater than Pr, that is, $a \times PRR + b \times TP > Pr$, the sub-operating system sends the application to the global memory management service module, so as to allocate the currently acquirable memory from the global sharing memory. The global memory management service module may obtain N by means of calculation according to a formula $a \times R/(P+N) + b \times TP \times P/(P+N) \leq Pr$, then round N up, and use N that has been rounded up as a minimum quantity of memory blocks to allocate memory to the sub-operating system. In the formula $a \times R/(P+N) + b \times TP \times P/(P+N) \leq Pr$, R represents the total quantity, which is counted in the foregoing step S101, of replaced pages in the task scheduling period of a predetermined quantity of times, P represents the total quantity of physical pages, TP represents the memory residence time ratio, Pr represents the memory pressure threshold, and a and b are the ratio adjustment parameters of the page replacement rate PRR and the memory residence time ratio TP in the linear combination $a \times PRR + b \times TP$.

That the sub-operating system sends the application to the global memory management service module, so as to allocate the currently acquirable memory from the global sharing memory includes the following steps.

S1031. The sub-operating system sends a memory application message to the global memory management service module.

When receiving the memory application message, the global memory management service module determines, according to a current situation of global free memory, whether to allocate memory to the sub-operating system, and a main process for determining whether to allocate memory to the sub-operating system includes that the global memory management service module queries a current free memory queue list so as to acquire a quantity of current free memory blocks. The following three cases may occur, that is: (1) memory is sufficient for allocation; (2) memory is insufficient for completion of this allocation; and (3) two sub-operating systems simultaneously apply, but memory is insufficient for allocation to the two sub-operating systems.

For case (1), the global memory management service module may allocate memory to a sub-operating system that applies for memory. For case (2), the global memory management service module may allocate a part of memory to a sub-operating system that applies for memory, and at the same time, update an occupation situation of current global memory. An abnormal case of case (3) is handled by an abnormal program handling module, and in this case, the global memory management service module proportionally allocates a part of memory according to values of memory pressures of the two sub-operating systems.

After a size of allocatable memory is acquired, the global memory management service module selects an allocatable memory block from a free memory queue and marks the allocatable memory block as an unavailable state. At the same time, the global memory management service module sends a memory allocation message to the sub-operating system that applies for memory, where the memory allocation message carries a description message of the allocatable memory block.

S1032. The sub-operating system receives a memory allocation message sent by the global memory management service module.

S1033. The sub-operating system adds an allocatable memory block to a physical memory queue of the sub-operating system according to a description message of the allocatable memory block, and marks the allocatable memory block as an unavailable state.

S1034. The sub-operating system sends an update confirmation message to the global memory management service module.

After receiving the update confirmation message returned by the sub-operating system that applies for memory, the global memory management service module deletes the memory block that is originally marked as unavailable from the free memory queue list and sends a response message to the sub-operating system that applies for memory.

S1035. After receiving a message that is in response to the update confirmation message and is returned by the global memory management service module, the sub-operating system marks the allocatable memory block that is marked as the unavailable state as an available state.

In this embodiment of the present invention, the sub-operating system uses a variable to record a quantity of pages of a working set in a period of time, and this period of time is measured by using task scheduling of a predetermined quantity of times. The variable is used to count a quantity of pages of a working set of a task each time when the task is scheduled, a quantity of page replacement times of each task in a time slice that the task occupies is used as a quantity of pages of a working set of the task, and a maximum value among quantities of working set pages of N times of task scheduling is used as a quantity of pages of a working set in this period of time. Because the sub-operating system always counts working set pages of recent N times of task scheduling, the quantity of pages of a working set is updated in a process of each task scheduling.

To reduce inappropriate use of a resource, the sub-operating system may actively release free memory, that is, if the sub-operating system confirms that a quantity of currently free pages is greater than a quantity of current working set pages of the sub-operating system, the sub-operating system sends a memory releasable message to the global memory management service module so as to apply for releasing memory; and memory, except working set pages, in a free page, that is, memory that is obtained by subtracting a quantity of working set pages from a quantity of physical pages is used as releasable memory. That the sub-operating system sends the memory releasable message to the global memory management service module so as to apply for releasing memory includes step S1 to step S3.

S1. The sub-operating system sends the memory releasable message to the global memory management service module.

After receiving the memory releasable message, the global memory management service module sends a memory release message to the sub-operating system, where the memory release message is used as a response to a memory release request of the sub-operating system.

S2. The sub-operating system receives a memory release message returned by the global memory management service module.

After receiving the memory release message returned by the global memory management service module, the sub-operating system marks releasable memory as an unavailable state.

S3. After acquiring a free memory area from a local free memory queue and updating a machine status, the sub-operating system returns memory area release information to the global memory management service module, so that the global memory management service module updates a global free memory queue.

The updating the machine status mainly includes updating a physical memory registration table, a memory page use table, and the like.

After receiving the memory area release information returned by the sub-operating system, the global memory management service module sends update information to the sub-operating system.

The sub-operating system updates a local free memory list and returns update confirmation information to the global memory management service module, and the global memory management service module updates the global free memory queue to complete this memory release process.

Abnormality handling during memory release may be performed according to an actual size of free memory, that is, when the sub-operating system receives the memory release message returned by the global memory management service module and when free memory of the free memory queue is insufficient for releasing a memory releasing memory at this time is canceled and a specific method is directly discarding the memory release message. If the global memory management service module has not received the update confirmation message from the sub-operating system for a long time, the global memory management service module considers, by default, that the update information has been received, and completes an entire memory release process.

It may be learned from the global memory sharing method provided in the foregoing embodiment of the present invention that, each sub-operating system in multiple operating systems determines, according to a value relationship between a memory pressure index and a memory pressure threshold of the sub-operating system, whether to send, to a global memory management service module, a request for applying for memory. Therefore, according to the method provided in this embodiment of the present invention, in an architecture of the multiple operating systems, each sub-operating system can complete much adaptive work, which reduces complexity of the global memory management service module and improves system performance. Meanwhile, because the sub-operating systems can independently complete work of applying for and releasing memory, a utilization rate of global memory may be improved, and the architecture of the multiple operating systems may have better extensibility.

Figure 3:
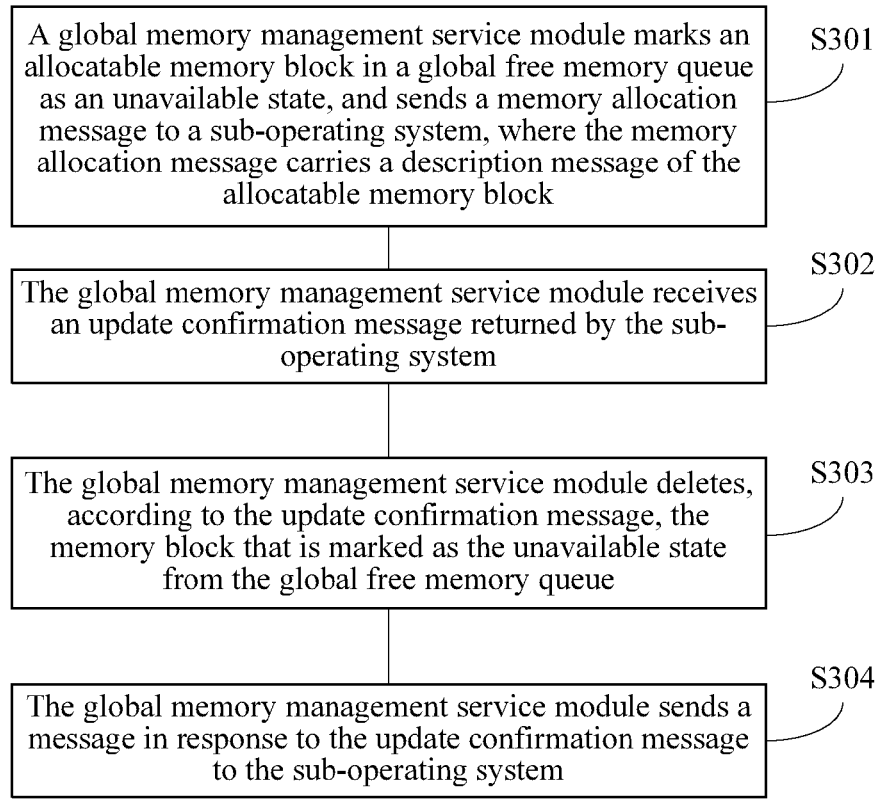
FIG. 3 is a schematic flowchart of a global memory sharing method according to an embodiment of the present invention.

Referring to FIG. 3, FIG. 3 is a schematic flowchart of a global memory sharing method according to an embodiment of the present invention. The method mainly includes step S301, step S302, step S303, and step S304.

S301. A global memory management service module marks an allocatable memory block in a global free memory queue as an unavailable state, and sends a memory allocation message to a sub-operating system, where the memory allocation message carries a description message of the allocatable memory block.

When a sub-operating system in multiple operating systems obtains, by means of calculation, that a memory pressure index of the sub-operating system is greater than a memory pressure threshold, the sub-operating system sends an application to the global memory management service module, so as to allocate currently acquirable memory from global sharing memory. The application is sent in a manner of a memory application message.

When receiving the memory application message, the global memory management service module determines, according to a current situation of global free memory, whether to allocate memory to the sub-operating system, and a main process for determining whether to allocate memory to the sub-operating system includes that the global memory management service module queries a current free memory queue list so as to acquire a quantity of current free memory blocks. The following three cases may occur, that is: (1) memory is sufficient for allocation; (2) memory is insufficient for completion of this allocation; and (3) two sub-operating systems simultaneously apply, but memory is insufficient for allocation to the two sub-operating systems.

For case (1), the global memory management service module may allocate memory to a sub-operating system that applies for memory. For case (2), the global memory management service module may allocate a part of memory to a sub-operating system that applies for memory, and at the same time, update an occupation situation of current global memory. An abnormal case of case (3) is handled by an abnormal program handling module, and in this case, the global memory management service module proportionally allocates a part of memory according to values of memory pressures of the two sub-operating systems.

After a size of allocatable memory is acquired, the global memory management service module selects an allocatable memory block from a free memory queue and marks the allocatable memory block as an unavailable state. At the same time, the global memory management service module sends a memory allocation message to the sub-operating system that applies for memory, where the memory allocation message carries a description message of the allocatable memory block. The sub-operating system adds the allocatable memory block to a physical memory queue of the sub-operating system according to the description message of the allocatable memory block, and marks the allocatable memory block as an unavailable state; and the sub-operating system sends an update confirmation message to the global memory management service module.

S302. The global memory management service module receives an update confirmation message returned by the sub-operating system.

S303. The global memory management service module deletes, according to the update confirmation message, the memory block that is marked as the unavailable state from the global free memory queue.

S304. The global memory management service module sends a message in response to the update confirmation message to the sub-operating system.

To reduce inappropriate use of a resource, the global memory management service module further receives, from the sub-operating system, an application for actively releasing free memory, that is, the global memory management service module receives a memory releasable message that is sent by the sub-operating system when the sub-operating system confirms that a quantity of currently free pages is greater than a quantity of current working set pages of the sub-operating system, so as to release memory, which includes S1 to S4.

S1. The global memory management service module receives the memory releasable message sent by the sub-operating system.

S2. The global memory management service module returns a memory release message to the sub-operating system according to the memory releasable message.

After receiving the memory release message returned by the global memory management service module, the sub-operating system marks releasable memory as an unavailable state, and after acquiring a free memory area from a local free memory queue and updating a machine status, returns memory area release information to the global memory management service module, so that the global memory management service module updates the global free memory queue.

S3. The global memory management service module receives memory area release information returned by the sub-operating system.

S4. The global memory management service module updates the global free memory queue.

After receiving the memory area release information returned by the sub-operating system, the global memory management service module sends update information to the sub-operating system. The sub-operating system updates a local free memory list and returns update confirmation information to the global memory management service module. The global memory management service module updates the global free memory queue to complete this memory release process.

Figure 4:
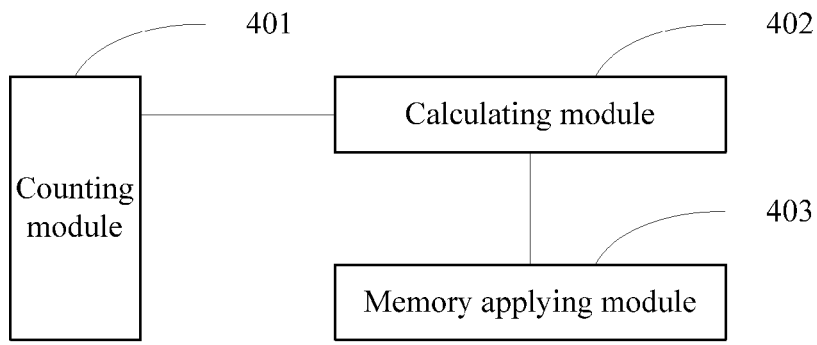
FIG. 4 is a schematic structural diagram of a global memory sharing apparatus according to an embodiment of the present invention.

Referring to FIG. 4, FIG. 4 is a schematic structural diagram of a global memory sharing apparatus according to an embodiment of the present invention. For ease of description, only parts related to this embodiment of the present invention are shown. The global memory sharing apparatus shown in FIG. 4 may be any sub-operating system in an architecture of multiple operating systems, and includes a counting module 401, a calculating module 402, and a memory applying module 403.

The counting module 401 is configured to count a page replacement rate in a task scheduling period of a predetermined quantity of times, and a memory residence time ratio in a page replacement period.

The calculating module 402 is configured to calculate a memory pressure index according to the page replacement rate and the memory residence time ratio.

The memory applying module 403 is configured to, when the memory pressure index is greater than a memory pressure threshold, send an application to a global memory management service module, where the application is used for the global memory management service module to allocate currently acquirable memory from global sharing memory to the sub-operating system. The GMMS is a memory management service module or subsystem that is in the architecture of the multiple operating systems and runs in a management operating system, and is responsible for coordinating a situation that each sub-operating system uses global memory, for example, allocating basic running memory to each sub-operating system, and re-allocating memory to a sub-operating system and releasing memory according to an application of the sub-operating system in a process in which the sub-operating system runs. The global sharing memory may be merely a memory array, or may be a memory pool formed by connecting multiple memory arrays through a PCIe interface or another interface. As shown in FIG. 2, FIG. 2 is a schematic diagram of an architecture of multiple operating systems including global sharing memory according to an embodiment of the present invention. Data of all sub-operating systems is placed in different areas of the global sharing memory, and when a sub-operating system starts, the global memory management service module allocates basic running memory to the sub-operating system. Then, the sub-operating system may dynamically apply for or release memory when running, and the global memory management service module allocates, in a unit of block, memory in different areas to different sub-operating systems.

When the calculating module 402 obtains, by means of calculation, the memory pressure index according to the page replacement rate and the memory residence time ratio and the memory pressure index is greater than the memory pressure threshold, the memory applying module 403 sends the application to the global memory management service module. The global memory management service module may obtain N by means of calculation according to a formula $a \times R/(P+N) + b \times TP \times P/(P+N) \leq Pr$, then round N up, and use N that has been rounded up as a minimum quantity of memory blocks to allocate memory to the sub-operating system. In the formula $a \times R/(P+N) + b \times TP \times P/(P+N) \leq Pr$, R represents a total quantity, which is counted by the counting module 401, of replaced pages in the task scheduling period of a predetermined quantity of times, P represents a total quantity of physical pages, TP represents the memory residence time ratio, Pr represents the memory pressure threshold, and a and b are ratio adjustment parameters of the page replacement rate PRR and the memory residence time ratio TP in a linear combination $a \times PRR + b \times TP$.

It should be noted that, in the foregoing implementation manner of the global memory sharing apparatus, division of functional modules is merely used as an example, and the foregoing functions may be assigned to different functional modules according to an actual need for implementation, for example, according to a corresponding hardware configuration requirement or for ease of software implementation, that is, an internal structure of the global memory sharing apparatus is divided into different functional modules, to implement all or a part of the functions described above. Moreover, in an actual application, corresponding functional modules in this embodiment may be implemented by corresponding hardware, or may be implemented by corresponding hardware executing corresponding software; for example, the foregoing counting module may be hardware that has a function of executing counting of the page replacement rate in the task scheduling period of a predetermined quantity of times, and the memory residence time ratio in the page replacement period, such as a counter, or may be a universal processor or another hardware device that can execute a corresponding computer program to implement the foregoing function; for another example, the foregoing memory applying module may be hardware that has a function of executing, when the memory pressure index is greater than the memory pressure threshold, sending of the application to the global memory management service module, so as to allocate the currently acquirable memory from the global sharing memory, such as a memory applying device, or may be a universal processor or another hardware device that can execute a corresponding computer program to implement the foregoing function. (The principle of the foregoing description is applicable to each embodiment provided in this specification.)

In the global memory sharing apparatus shown in FIG. 4, the sub-operating system is any operating system for constituting an architecture of multiple operating systems, and each sub-operating system includes an LMMS module and an HB module, where the LMMS module is responsible for managing memory of a sub-operating system to which the LMMS module belongs, and the HB module provides a heartbeat mechanism and is responsible for providing, for the management operating system, "heartbeat" information and other information that are used to indicate that the sub-operating system is running.

Each sub-operating system uses a variable to record a quantity of page swap-out times in a task scheduling period of a predetermined quantity of times, and the variable that is used to record the quantity of page swap-out times increases in each page replacement period. As an embodiment in which a page replacement rate in a task scheduling period of a predetermined quantity of times is counted, the counting module 401 may count a quantity of page swap-out times in the task scheduling period of a predetermined quantity of times, and after the quantity of page swap-out times in the task scheduling period is counted, it is not difficult to obtain a total quantity of replaced pages (marked as R) in this period. For a given system, a total quantity of physical pages (marked as P) is known; therefore, a ratio R/P of a total quantity of replaced pages in the task scheduling period to a quantity of physical pages may be obtained by means of calculation, and the ratio is used as the page replacement rate in the task scheduling period of a predetermined quantity of times. For ease of description, the page replacement rate in the task scheduling period of a predetermined quantity of times is marked as PRR, and then PRR=R/P.

In the architecture of the multiple operating systems, each sub-operating system further uses a variable $TR_{min}$ to record a minimum residence time of a page in memory. A residence time (marked as TR) of a page in memory may be expressed by a difference between a current time stamp Tc and a page swap-in time stamp Ti, that is: memory residence time TR=current time stamp Tc−page swap-in time stamp Ti.

In each page replacement period, the sub-operating system calculates a memory residence time of a current swap-out page. If a current memory residence time is less than a previous memory residence time, the current memory residence time is used as a minimum memory residence time $TR_{min}$, and if the current memory residence time is greater than the previous memory residence time, the previous memory residence time is used as the minimum memory residence time $TR_{min}$. After the sub-operating system counts the minimum memory residence time $TR_{min}$, the counting module 401 may use a ratio of the minimum memory residence time $TR_{min}$ to a memory residence time threshold Tt as a memory residence time ratio (marked as TP), that is, TP=$TR_{min}$/Tt. In the global memory sharing apparatus shown in FIG. 4, the memory residence time ratio TP is one of parameters for measuring a memory pressure index of a sub-operating system in the architecture of the multiple operating systems.

Figure 5:
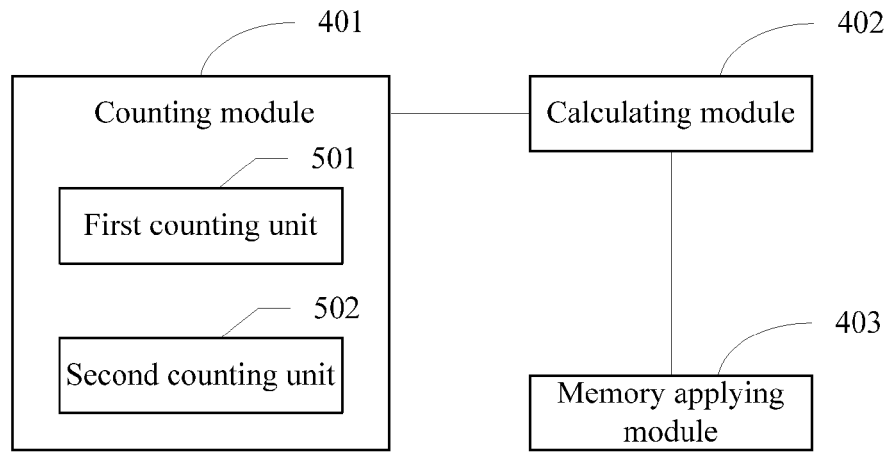
FIG. 5 is a schematic structural diagram of a global memory sharing apparatus according to another embodiment of the present invention.

The counting module 401 shown in FIG. 4 may include a first counting unit 501 and a second counting unit 502, as shown in a global memory sharing apparatus shown in FIG. 5 according to another embodiment of the present invention.

The first counting unit 501 is configured to count a quantity of page swap-out times in the task scheduling period of a predetermined quantity of times, and use a ratio of a total quantity of replaced pages in the task scheduling period to a quantity of physical pages as the page replacement rate.

The second counting unit 502 is configured to count a minimum memory residence time, and use a ratio of the minimum memory residence time to a memory residence time threshold as the memory residence time ratio.

Figure 6A:
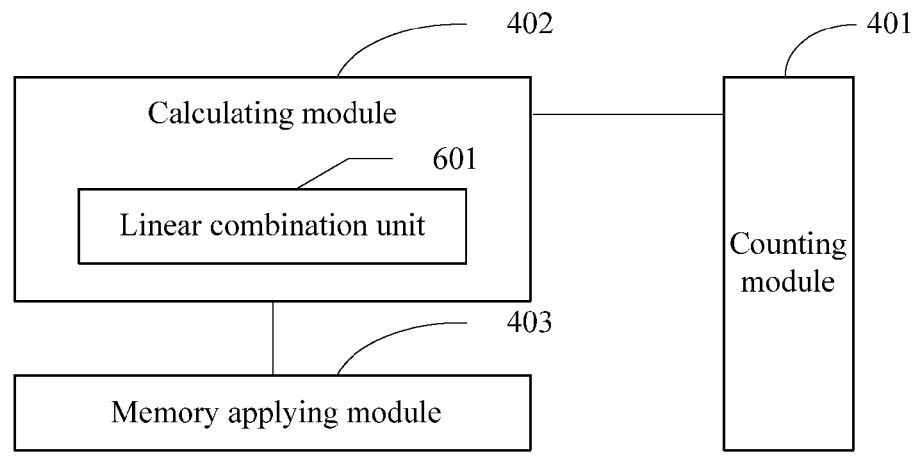
FIG. 6A is a schematic structural diagram of a global memory sharing apparatus according to another embodiment of the present invention.
Figure 6B:
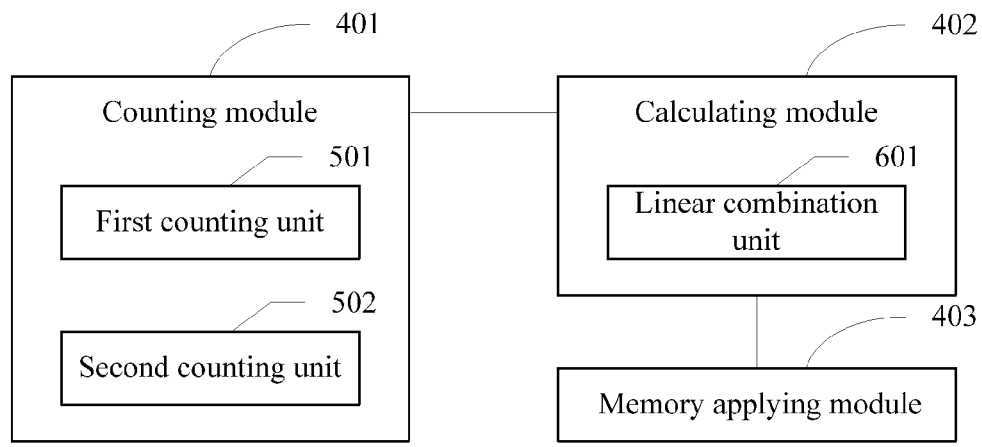
FIG. 6B is a schematic structural diagram of a global memory sharing apparatus according to another embodiment of the present invention.

The calculating module 402 shown in FIG. 4 or FIG. 5 may include a linear combination unit 601, as shown in a global memory sharing apparatus shown in FIG. 6A or FIG. 6B according to another embodiment of the present invention. The linear combination unit 601 is configured to calculate a linear combination a×PRR+b×TP of the page replacement rate and the memory residence time ratio, and use a×PRR+b×TP as the memory pressure index, where a and b are ratio adjustment parameters of the page replacement rate PRR and the memory residence time ratio in the linear combination, PRR is the page replacement rate in the task scheduling period of a predetermined quantity of times, and TP is the memory residence time ratio.

Figure 7A:
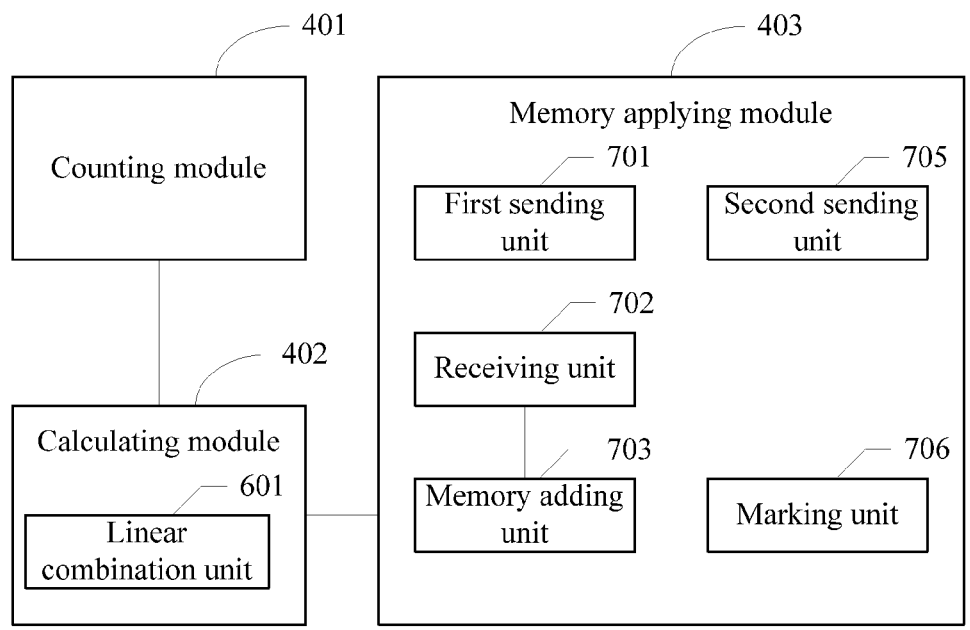
FIG. 7A is a schematic structural diagram of a global memory sharing apparatus according to another embodiment of the present invention.
Figure 7B:
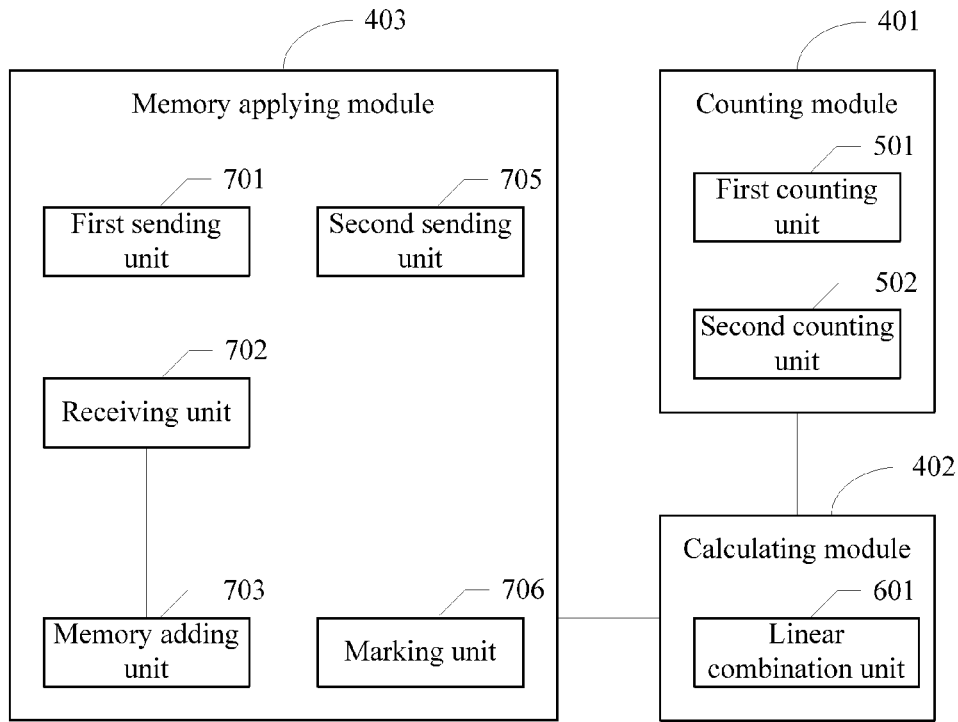
FIG. 7B is a schematic structural diagram of a global memory sharing apparatus according to another embodiment of the present invention.

The memory applying module 403 shown in FIG. 6A or FIG. 6B may include a first sending unit 701, a receiving unit 702, a memory adding unit 703, a second sending unit 705, and a marking unit 706, as shown in a global memory sharing apparatus shown in FIG. 7A or FIG. 7B according to another embodiment of the present invention.

The first sending unit 701 is configured to send a memory application message to the global memory management service module.

The receiving unit 702 is configured to receive a memory allocation message sent by the global memory management service module, where the memory allocation message carries a description message of an allocatable memory block.

The memory adding unit 703 is configured to add an allocatable memory block to a physical memory queue of the memory adding unit 703 according to the description message of the allocatable memory block, and mark the allocatable memory block as an unavailable state.

The second sending unit 705 is configured to send an update confirmation message to the global memory management service module.

The marking unit 706 is configured to, after a message that is in response to the update confirmation message and is returned by the global memory management service module is received, mark the allocatable memory block that is marked as the unavailable state as an available state.

It should be noted that, when receiving the memory application message sent by the first sending unit 701, the global memory management service module determines, according to a current situation of global free memory, whether to allocate memory to the sub-operating system, and a main process for determining whether to allocate memory to the sub-operating system includes that the global memory management service module queries a current free memory queue list so as to acquire a quantity of current free memory blocks. The following three cases may occur, that is: (1) memory is sufficient for allocation; (2) memory is insufficient for completion of this allocation; and (3) two sub-operating systems simultaneously apply, but memory is insufficient for allocation to the two sub-operating systems. For case (1), the global memory management service module may allocate memory to a sub-operating system that applies for memory. For case (2), the global memory management service module may allocate a part of memory to a sub-operating system that applies for memory, and at the same time, update an occupation situation of current global memory. An abnormal case of case (3) is handled by an abnormal program handling module, and in this case, the global memory management service module proportionally allocates a part of memory according to values of memory pressures of the two sub-operating systems. After a size of allocatable memory is acquired, the global memory management service module selects an allocatable memory block from a free memory queue and marks the allocatable memory block as an unavailable state. At the same time, the global memory management service module sends a memory allocation message to the sub-operating system that applies for memory, where the memory allocation message carries a description message of the allocatable memory block. The receiving unit 702 receives the memory allocation message.

Figure 8A:
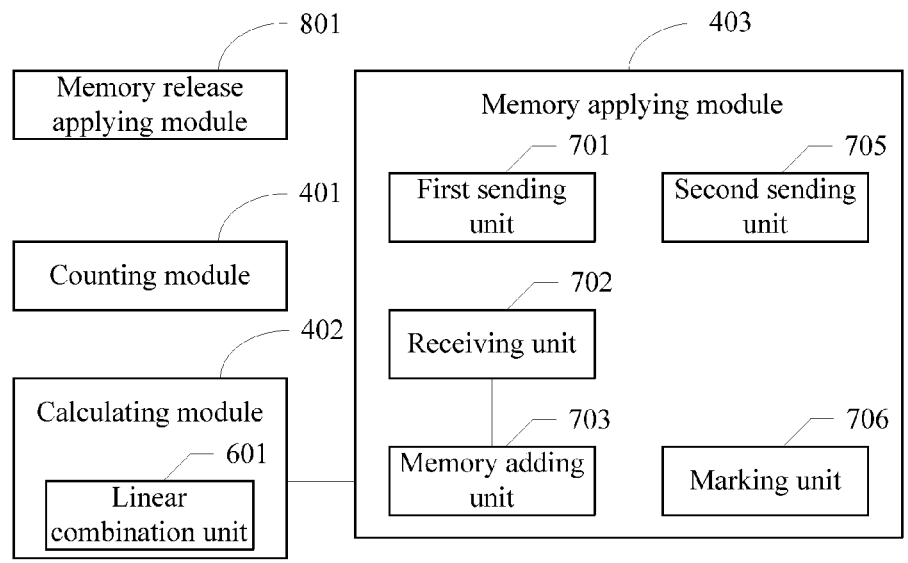
FIG. 8A is a schematic structural diagram of a global memory sharing apparatus according to another embodiment of the present invention.
Figure 8B:
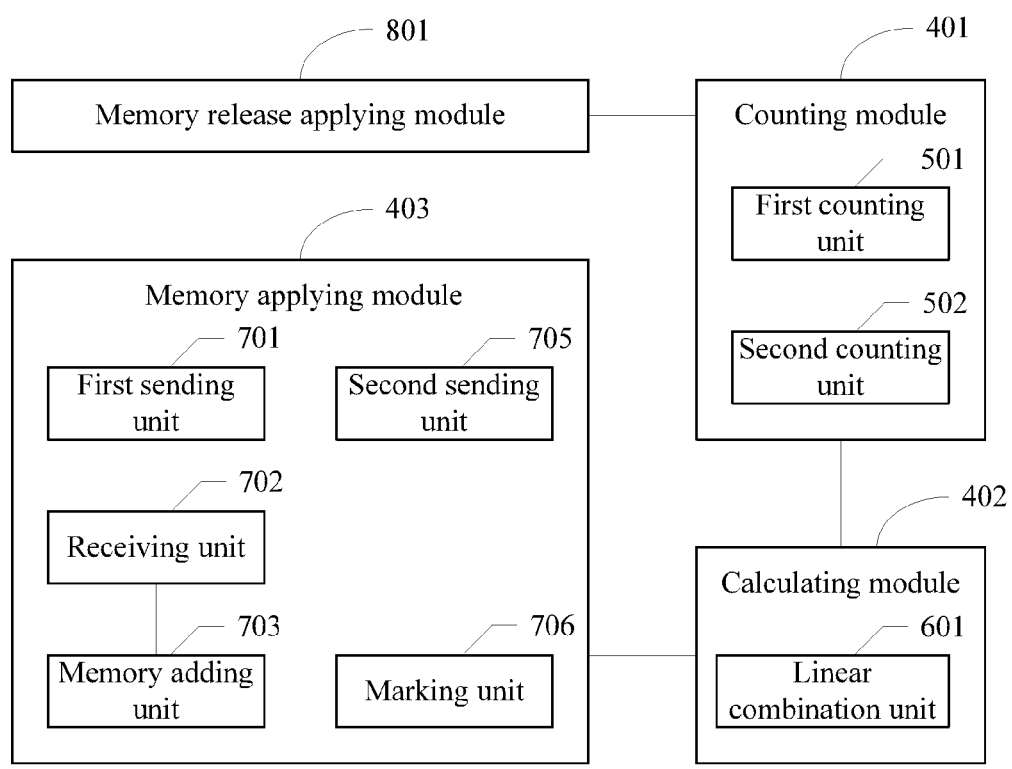
FIG. 8B is a schematic structural diagram of a global memory sharing apparatus according to another embodiment of the present invention.

The global memory sharing apparatus shown in FIG. 7A or FIG. 7B may further include a memory release applying module 801, as shown in a global memory sharing apparatus shown in FIG. 8A or FIG. 8B according to another embodiment of the present invention. The memory release applying module 801 is configured to, when it is confirmed that a quantity of currently free pages is greater than a quantity of current working set pages of the sub-operating system, send a memory releasable message to the global memory management service module so as to apply for releasing memory.

In the global memory sharing apparatus shown in FIG. 8A or FIG. 8B, the sub-operating system uses a variable to record a quantity of pages of a working set in a period of time, and this period of time is measured by using task scheduling of a predetermined quantity of times. The variable is used to count a quantity of pages of a working set of a task each time when the task is rotated, a quantity of page replacement times of each task in a time slice that the task occupies is used as a quantity of pages of a working set of the task, and a working page whose size is largest among sizes of working set pages of N times of task scheduling is used as a working set page in this period of time. Because the sub-operating system always counts working set pages of recent N times of task scheduling, the quantity of working set pages is updated in a process of each task scheduling.

Figure 9A:
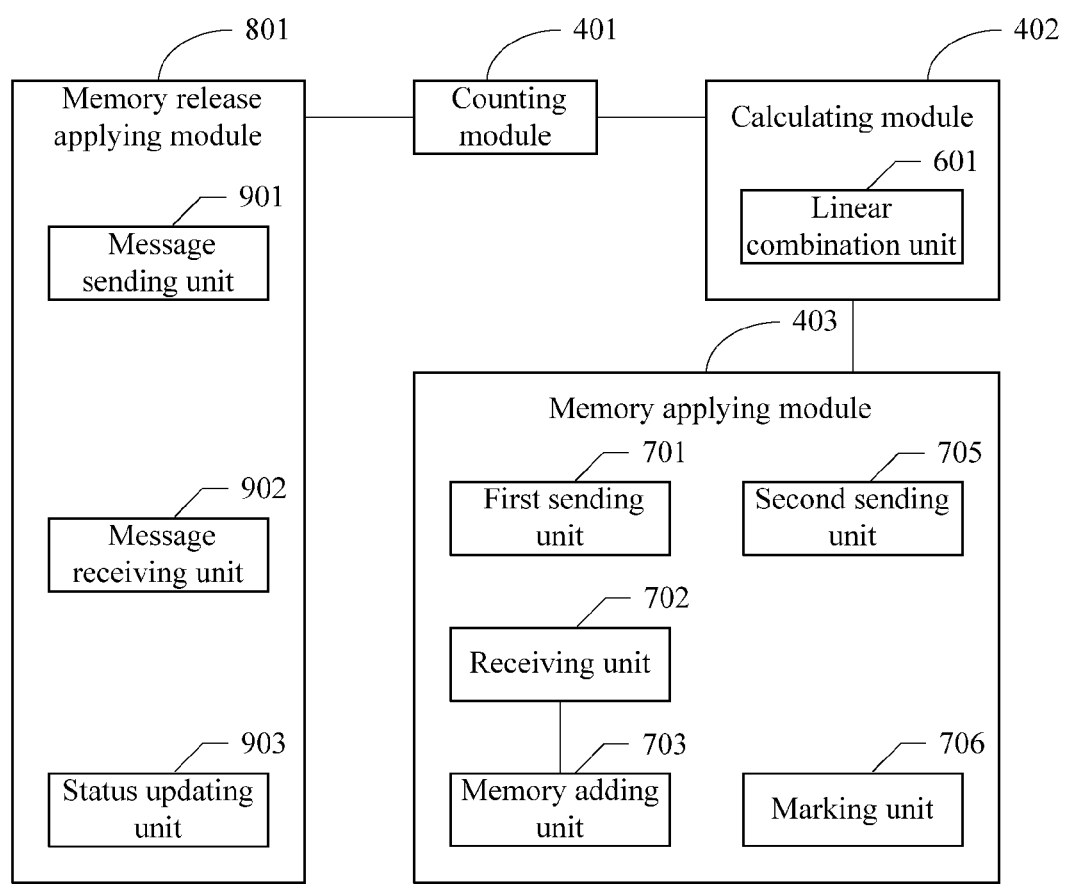
FIG. 9A is a schematic structural diagram of a global memory sharing apparatus according to another embodiment of the present invention.
Figure 9B:
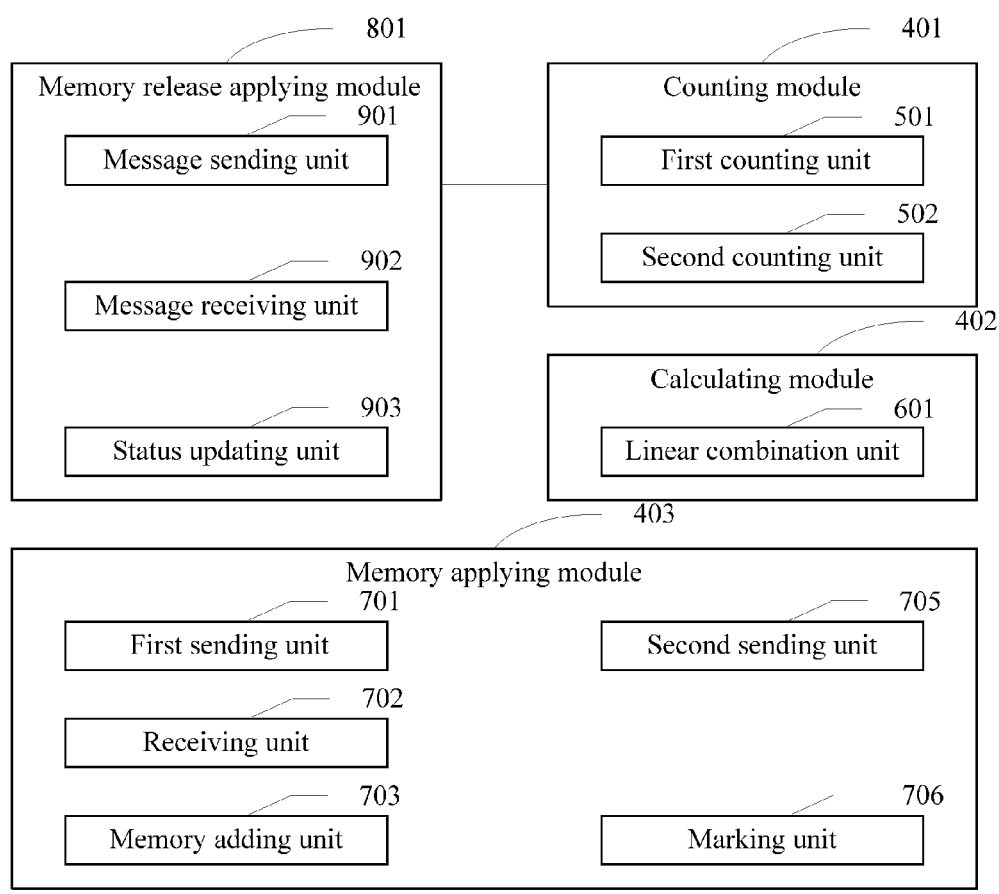
FIG. 9B is a schematic structural diagram of a global memory sharing apparatus according to another embodiment of the present invention.

To reduce inappropriate use of a resource, the sub-operating system may actively release free memory, that is, if the sub-operating system confirms that a quantity of currently free pages is greater than a quantity of current working set pages of the sub-operating system, the sub-operating system sends a memory releasable message to the global memory management service module so as to apply for releasing memory; and memory, except working set pages, in a free page, that is, memory that is obtained by subtracting a quantity of working set pages from a quantity of physical pages is used as releasable memory. In this way, the memory release applying module 801 shown in FIG. 8A or FIG. 8B may include a message sending unit 901, a message receiving unit 902, and a status updating unit 903, as shown in a global memory sharing apparatus shown in FIG. 9A or FIG. 9B according to another embodiment of the present invention.

The message sending unit 901 is configured to send the memory releasable message to the global memory management service module.

The message receiving unit 902 is configured to receive the memory release message returned by the global memory management service module.

The status updating unit 903 is configured to, after the sub-operating system acquires a free memory area from a local free memory queue and updates a machine status, return memory area release information to the global memory management service module, so that the global memory management service module updates a global free memory queue.

Figure 10:
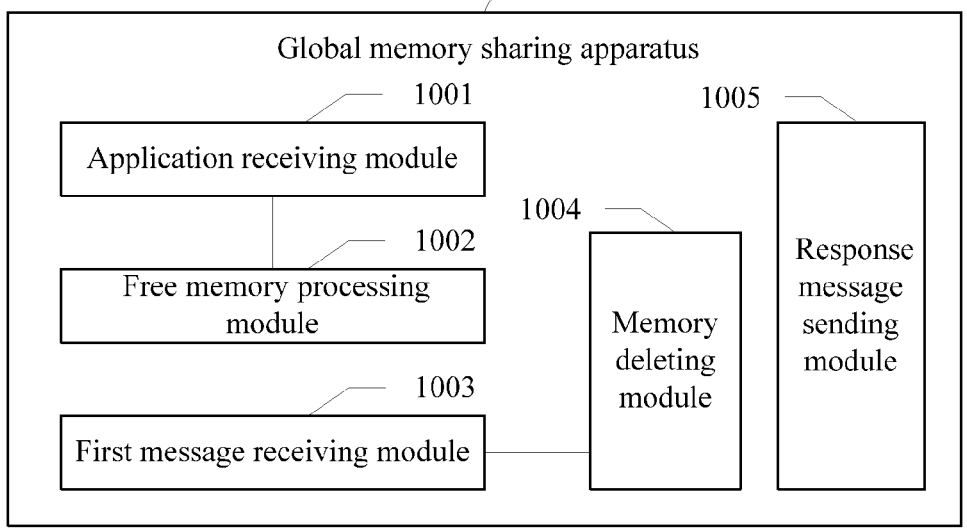
FIG. 10 is a schematic structural diagram of a global memory sharing apparatus according to another embodiment of the present invention.

Referring to FIG. 10, FIG. 10 is a schematic structural diagram of a global memory sharing apparatus according to another embodiment of the present invention. For ease of description, only parts related to this embodiment of the present invention are shown. The global memory sharing apparatus 10 shown in FIG. 10 may be a global memory management service module or sub-system in an architecture of multiple operating systems, and includes an application receiving module 1001, a free memory processing module 1002, a first message receiving module 1003, a memory deleting module 1004, and a response message sending module 1005.

The application receiving module 1001 is configured to receive an application that is used for allocating currently acquirable memory from global sharing memory and is sent by a sub-operating system.

The free memory processing module 1002 is configured to mark an allocatable memory block in a global free memory queue as an unavailable state, and send a memory allocation message to the sub-operating system, where the memory allocation message carries a description message of allocatable memory block.

The first message receiving module 1003 is configured to receive an update confirmation message returned by the sub-operating system.

The memory deleting module 1004 is configured to delete, according to the update confirmation message, the memory block that is marked as the unavailable state from the global free memory queue.

The response message sending module 1005 is configured to send a message in response to the update confirmation message to the sub-operating system.

In the global memory sharing apparatus shown in FIG. 10, when the application receiving module 1001 receives the memory application message, the global memory management service module determines, according to a current situation of global free memory, whether to allocate memory to the sub-operating system, and a main process for determining whether to allocate memory to the sub-operating system includes that the global memory management service module queries a current free memory queue list so as to acquire a quantity of current free memory blocks. The following three cases may occur, that is: (1) memory is sufficient for allocation; (2) memory is insufficient for completion of this allocation; and (3) two sub-operating systems simultaneously apply, but memory is insufficient for allocation to the two sub-operating systems. For case (1), the global memory management service module may allocate memory to a sub-operating system that applies for memory. For case (2), the global memory management service module may allocate a part of memory to a sub-operating system that applies for memory, and at the same time, update an occupation situation of current global memory. An abnormal case of case (3) is handled by an abnormal program handling module, and in this case, the global memory management service module proportionally allocates a part of memory according to values of memory pressures of the two sub-operating systems. After a size of allocatable memory is acquired, the free memory processing module 1002 selects an allocatable memory block from a free memory queue and marks the allocatable memory block as an unavailable state. At the same time, the free memory processing module 1002 sends a memory allocation message to the sub-operating system that applies for memory, where the memory allocation message carries a description message of the allocatable memory block. The sub-operating system adds the allocatable memory block to a physical memory queue of the sub-operating system according to the description message of the allocatable memory block, and marks the allocatable memory block as an unavailable state; and the sub-operating system sends an update confirmation message to the global memory management service module.

It should be noted that, in the foregoing implementation manner of the global memory sharing apparatus, division of functional modules is merely used as an example, and the foregoing functions may be assigned to different functional modules according to an actual need for implementation, for example, according to a corresponding hardware configuration requirement or for ease of software implementation, that is, an internal structure of the global memory sharing apparatus is divided into different functional modules, to implement all or a part of the functions described above. Moreover, in an actual application, corresponding functional modules in this embodiment may be implemented by corresponding hardware, or may be implemented by corresponding hardware executing corresponding software; for example, the foregoing application receiving module may be hardware that has a function of executing receiving of the application that is used for allocating the currently acquirable memory from the global sharing memory and is sent by the sub-operating system, such as an application receiver, or may be a universal processor or another hardware device that can execute a corresponding computer program to implement the foregoing function; for another example, the foregoing free memory processing module may be hardware that has a function of executing marking of the allocatable memory block in the global free memory queue as the unavailable state, and sending of the memory allocation message to the sub-operating system, such as a free memory processor, or may be a universal processor or another hardware device that can execute a corresponding computer program to implement the foregoing function. (The principle of the foregoing description is applicable to each embodiment provided in this specification.)

Figure 11:
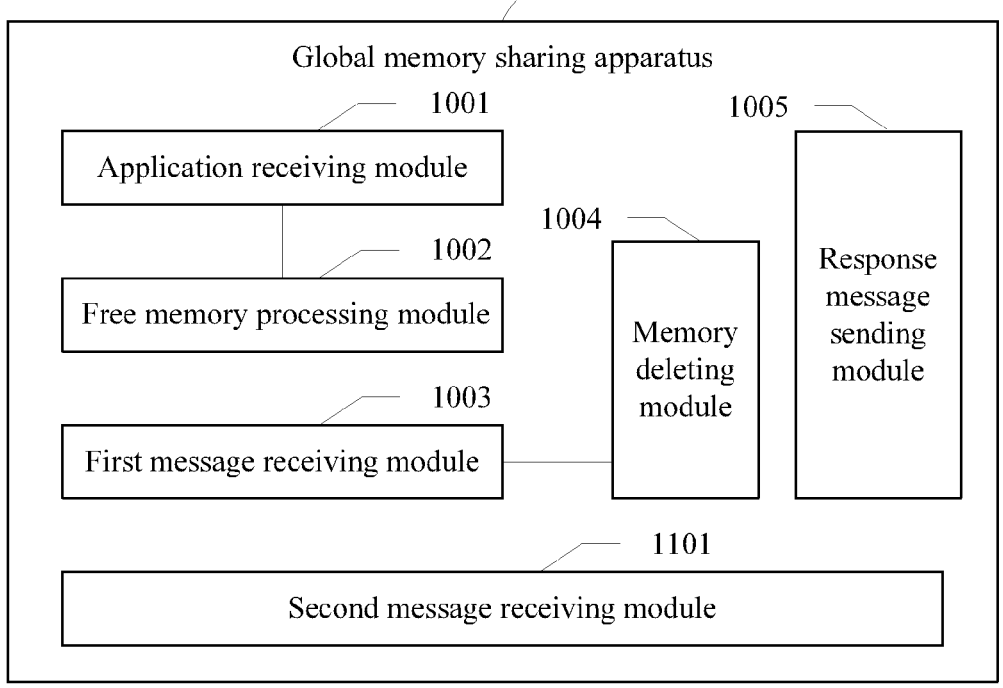
FIG. 11 is a schematic structural diagram of a global memory sharing apparatus according to another embodiment of the present invention.

The global memory sharing apparatus shown in FIG. 10 further includes a second message receiving module 1101, as shown in a global memory sharing apparatus 11 shown in FIG. 11 according to another embodiment of the present invention. The second message receiving module 1101 is configured to receive a memory releasable message that is sent by the sub-operating system when the sub-operating system confirms that a quantity of currently free pages is greater than a quantity of current working set pages of the sub-operating system, so as to release memory.

Figure 12:
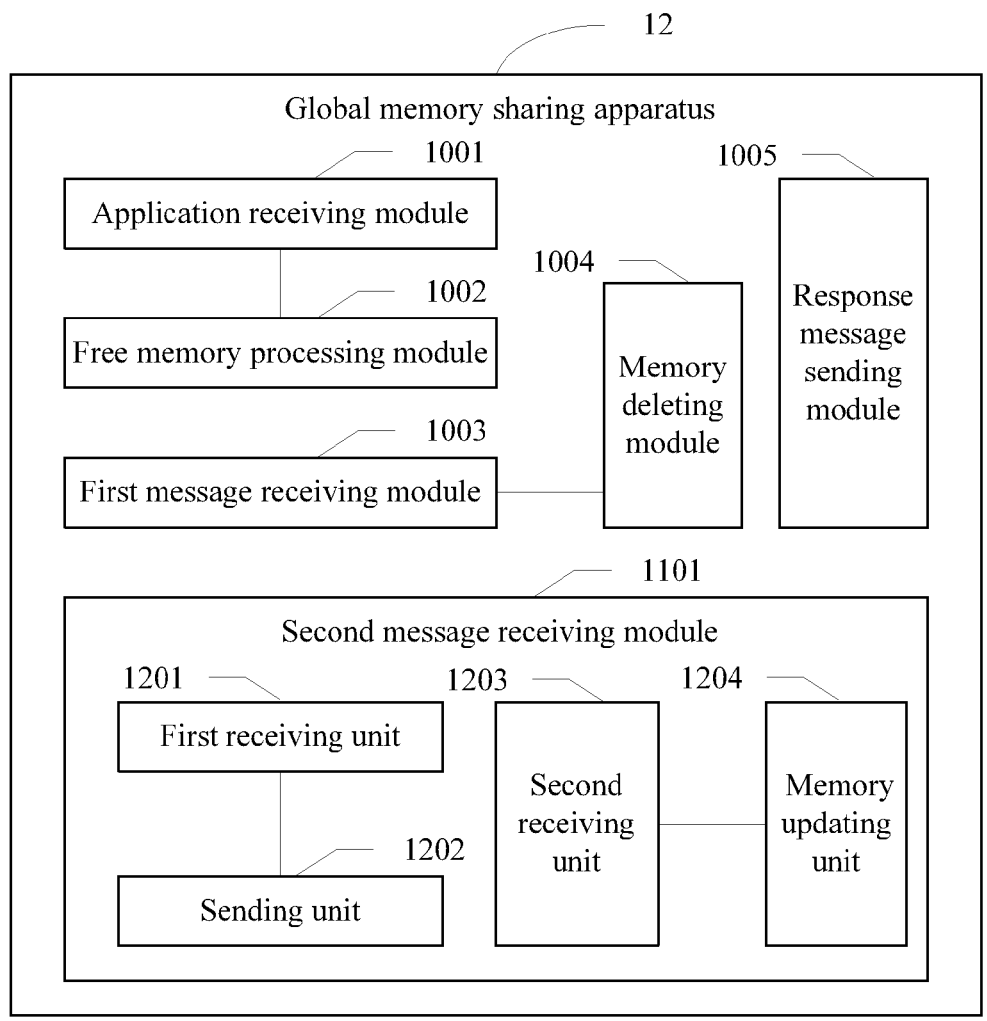
FIG. 12 is a schematic structural diagram of a global memory sharing apparatus according to another embodiment of the present invention.

The second message receiving module 1101 shown in FIG. 11 may include a first receiving unit 1201, a sending unit 1202, a second receiving unit 1203, and a memory updating unit 1204, as shown in a global memory sharing apparatus 12 shown in FIG. 12 according to another embodiment of the present invention.

The first receiving unit 1201 is configured to receive the memory releasable message sent by the sub-operating system.

The sending unit 1202 is configured to return a memory release message to the sub-operating system according to the memory releasable message.

The second receiving unit 1203 is configured to receive memory area release information returned by the sub-operating system.

The memory updating unit 1204 is configured to update the global free memory queue.

Figure 13:
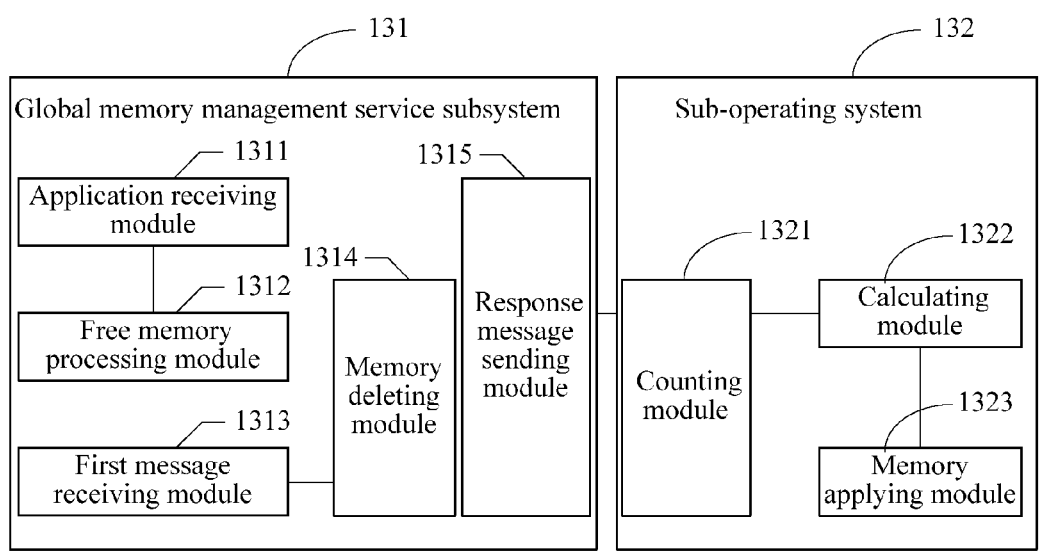
FIG. 13 is a schematic structural diagram of a communications system according to an embodiment of the present invention.

Referring to FIG. 13, FIG. 13 is a schematic structural diagram of a communications system according to an embodiment of the present invention. For ease of description, only parts related to this embodiment of the present invention are shown. The communications system shown in FIG. 13 includes a global memory management service subsystem 131 and at least one sub-operating system 132, where the global memory management service subsystem 131 includes an application receiving module 1311, a free memory processing module 1312, a first message receiving module 1313, a memory deleting module 1314, and a response message sending module 1315, and the sub-operating system 132 includes a counting module 1321, a calculating module 1322, and a memory applying module 1323.

The counting module 1321 is configured to count a page replacement rate PRR in a task scheduling period of a predetermined quantity of times, and a memory residence time ratio TP in a page replacement period.

The calculating module 1322 is configured to calculate a memory pressure index according to the page replacement rate PRR and the memory residence time ratio TP.

The memory applying module 1323 is configured to, when the memory pressure index is greater than a memory pressure threshold, send an application to the global memory management service subsystem 131, so as to allocate currently acquirable memory from global sharing memory.

The application receiving module 1311 is configured to receive the application that is used for allocating the currently acquirable memory from the global sharing memory and is sent by the sub-operating system 132.

The free memory processing module 1312 is configured to mark an allocatable memory block in a global free memory queue as an unavailable state, and send a memory allocation message to the sub-operating system 132, where the memory allocation message carries a description message of allocatable memory block.

The first message receiving module 1313 is configured to receive an update confirmation message returned by the sub-operating system 132.

The memory deleting module 1314 is configured to delete, according to the update confirmation message, the memory block that is marked as the unavailable state from the global free memory queue.

The response message sending module 1315 is configured to send a message in response to the update confirmation message to the sub-operating system 132.

It should be noted that content such as information exchange between the modules/units of the apparatus and the execution processes thereof is based on the same idea as the method embodiments of the present invention, and produces the same technical effects as the method embodiments of the present invention. For the specific content, reference may be made to the description in the method embodiments of the present invention, and details are not described herein again.

A person of ordinary skill in the art may understand that all or a part of the steps of the methods in the foregoing embodiments may be implemented by a program instructing relevant hardware, for example, one or more or all of the following methods.

Method 1: A sub-operating system counts a page replacement rate in a task scheduling period of a predetermined quantity of times, and a memory residence time ratio in a page replacement period; the sub-operating system calculates a memory pressure index according to the page replacement rate and the memory residence time ratio; and if the memory pressure index is greater than a memory pressure threshold, the sub-operating system sends an application to a global memory management service module, so as to allocate currently acquirable memory from global sharing memory.

Method 2: A global memory management service module receives an application that is used for allocating currently acquirable memory from global sharing memory and is sent by a sub-operating system; the global memory management service module marks an allocatable memory block in a global free memory queue as an unavailable state, and sends a memory allocation message to the sub-operating system, where the memory allocation message carries a description message of the allocatable memory block; the global memory management service module receives an update confirmation message returned by the sub-operating system; the global memory management service module deletes, according to the update confirmation message, the memory block that is marked as the unavailable state from the global free memory queue; and the global memory management service module sends a message in response to the update confirmation message to the sub-operating system.

A person of ordinary skill in the art may understand that all or some of the steps of the methods in the foregoing embodiments may be implemented by a program instructing relevant hardware. The program may be stored in a computer readable storage medium. The storage medium may include a read-only memory (ROM), a random access memory (RAM), a magnetic disk, or an optical disc.

The global memory sharing method and apparatus and the communications system are described in detail in the embodiments of the present invention. In this specification, specific examples are used to describe the principle and implementation manners of the present invention, and the descriptions of the foregoing embodiments are only intended to help understand the method and core idea of the present invention. Meanwhile, a person of ordinary skill in the art may, based on the idea of the present invention, make modifications with respect to the specific implementation manners and the application scope. In conclusion, the content of this specification shall not be construed as a limitation to the present invention.

What is claimed is:

1. A global memory sharing method, wherein the method comprises:
   counting, by a sub-operating system, a page replacement rate in a task scheduling period of a predetermined quantity of times, and a memory residence time ratio in a page replacement period;
   calculating, by the sub-operating system, a memory pressure index according to the page replacement rate and the memory residence time ratio; and
   sending, by the sub-operating system, an application to a global memory management service module when the memory pressure index is greater than a memory pressure threshold, wherein the application is used for applying for allocation of currently acquirable memory from global sharing memory.

2. The method according to claim 1, wherein counting, by the sub-operating system, the page replacement rate in the task scheduling period of the predetermined quantity of times, and the memory residence time ratio in the page replacement period comprises:
   counting, by the sub-operating system, a quantity of page swap-out times in the task scheduling period of a predetermined quantity of times, and using a ratio of a total quantity of page swap-out times in the task scheduling period to a quantity of physical pages as the page replacement rate; and
   counting, by the sub-operating system, a minimum memory residence time, and using a ratio of the minimum memory residence time to a memory residence time threshold as the memory residence time ratio.

3. The method according to claim 1, wherein calculating, by the sub-operating system, the memory pressure index according to the page replacement rate and the memory residence time ratio comprises:
   calculating a linear combination a×PRR+b×TP of the page replacement rate and the memory residence time ratio; and
   using a×PRR+b×TP as the memory pressure index,
   wherein a and h are ratio adjustment parameters of the page replacement rate and the memory residence time ratio in the linear combination, PRR is the page replacement rate, and TP is the memory residence time ratio.

4. The method according to claim 3, wherein sending, by the sub-operating system, the application to the global memory management service module, wherein the application is used for applying for allocation of currently acquirable memory from the global sharing memory comprises:
   sending, by the sub-operating system, a memory application message to the global memory management service module;
   receiving, by the sub-operating system, a memory allocation message sent by the global memory management service module, wherein the memory allocation message carries a description message of an allocatable memory block;
   adding, by the sub-operating system, the allocatable memory block to a physical memory queue of the sub-operating system according to the description message of the allocatable memory block, and marking the allocatable memory block as an unavailable state;
   sending, by the sub-operating system, an update confirmation message to the global memory management service module; and
   marking the allocatable memory block that is marked as the unavailable state as an available state after the sub-operating system receives a message that is in response to the update confirmation message and is returned by the global memory management service module.

5. The method according to claim 4, wherein the method further comprises sending a memory releasable message to the global memory management service module to apply for releasing memory when the sub-operating system determines that a quantity of currently free pages is greater than a quantity of current working set pages of the sub-operating system.

6. The method according to claim 5, wherein sending the memory releasable message to the global memory management service module to apply for releasing memory comprises:
   sending, by the sub-operating system, a memory releasable message to the global memory management service module;
   receiving, by the sub-operating system, the memory release message returned by the global memory management service module; and
   returning memory area release information to the global memory management service module such that the global memory management service module updates a global free memory queue after the sub-operating system acquires a free memory area from a local free memory queue and updates a machine status.

7. A global memory sharing method, wherein the method comprises:
   receiving, by a global memory management service module, an application that is used for allocating currently acquirable memory from global sharing memory and is sent by a sub-operating system;

marking, by the global memory management service module, an allocatable memory block in a global free memory queue as an unavailable state;

sending a memory allocation message to the sub-operating system, wherein the memory allocation message carries a description message of the allocatable memory block;

receiving, by the global memory management service module, an update confirmation message returned by the sub-operating system;

deleting, by the global memory management service module according to the update confirmation message, memory block that is marked as the unavailable state from the global free memory queue;

sending, by the global memory management service module, a message in response to the update confirmation message to the sub-operating system; and receiving, by the global memory management service module, a memory releasable message that is sent by the sub-operating system when the sub-operating system confirms that a quantity of currently free pages is greater than a quantity of current working set pages of the sub-operating system to release memory.

8. The method according to claim 7, wherein receiving, by the global memory management service module, the memory releasable message that is sent by the sub-operating system when the sub-operating system confirms that the quantity of currently free pages is greater than the quantity of current working set pages of the sub-operating system to release the memory comprises:

receiving, by the global memory management service module, the memory releasable message sent by the sub-operating system;

returning, by the global memory management service module, a memory release message to the sub-operating system according to the memory releasable message;

receiving, by the global memory management service module, memory area release information returned by the sub-operating system; and updating, by the global memory management service module, the global free memory queue.

9. A global memory sharing apparatus, wherein the apparatus comprises:

a non-transitory computer readable medium having instructions stored thereon; and a computer processor coupled to the non-transitory computer readable medium and configured to execute the instructions to:

count a page replacement rate in a task scheduling period of a predetermined quantity of times, and a memory residence time ratio in a page replacement period;

calculate a memory pressure index according to the page replacement rate and the memory residence time ratio; and send an application to a global memory management service module when the memory pressure index is greater than a memory pressure threshold, wherein the application is used for applying for allocating currently acquirable memory from global sharing memory.

10. The apparatus according to claim 9, wherein the computer processor is further configured to execute the instructions to:

count a quantity of page swap-out times in the task scheduling period of a predetermined quantity of times;

use a ratio of a total quantity of replaced pages in the task scheduling period to a quantity of physical pages as the page replacement rate PRR;

count a minimum memory residence time; and use a ratio of the minimum memory residence time to a memory residence time threshold as the memory residence time ratio.

11. The apparatus according to claim 9, wherein the computer processor is further configured to execute the instructions to:

calculate a linear combination a×PRR+b×TP of the page replacement rate PRR and the memory residence time ratio TP; and use a×PRR+b×TP as the memory pressure index, wherein a and b are ratio adjustment parameters of the page replacement rate and the memory residence time ratio in the linear combination, PRR is the page replacement rate, and TP is the memory residence time ratio.

12. The apparatus according to claim 11, wherein the computer processor is her configured to execute the instructions to:

send a memory application message to the global memory management service module;

receive a memory allocation message sent by the global memory management service module, wherein the memory allocation message carries a description message of the allocatable memory block;

add the allocatable memory block to a physical memory queue according to the description message of the allocatable memory block;

mark the allocatable memory block as an unavailable state;

send an update confirmation message to the global memory management service module; and mark the allocatable memory block that is marked as the unavailable state as an available state after a message that is in response to the update confirmation message and is returned by the global memory management service module is received.

13. The apparatus according to claim 12, wherein the computer processor is further configured to execute the instructions to send a memory releasable message to the global memory management service module to apply for releasing memory when confirmed that a quantity of current free pages is greater than a quantity of current working set pages of the sub-operating system.

14. The apparatus according to claim 13, wherein the computer processor is further configured to execute instructions to:

send the memory releasable message to the global memory manage service module;

receive the memory release message returned by the global memory management service module; and return memory area release information to the global memory management service module such that the global memory management service module updates a global free memory queue after the sub-operating system acquires a free memory area from a local free memory queue and updates a machine status.

15. A global memory sharing apparatus, wherein the apparatus comprises:

a non-transitory computer readable medium having instructions stored thereon; and a computer processor coupled to the non-transitory computer readable medium and configured to execute the instructions to:

receive an application that is used for allocating currently acquirable memory from global sharing memory and is sent by a sub-operating system;

mark an allocatable memory block in a global free memory queue as an unavailable state;

send a memory allocation message to the sub-operating system, wherein the memory allocation message carries a description message of an allocatable memory block;

receive an update confirmation message returned by the sub-operating system;

delete, according to the update confirmation message, the allocatable memory block that is marked as the unavailable state from the global free memory queue;

send a message in response to the update confirmation message to the sub-operating system; and receive a memory releasable message that is sent by the sub-operating system when the sub-operating system confirms that a quantity of currently free pages is greater than a quantity of current working set pages of the sub-operating system to release memory.

16. The apparatus according to claim 15, wherein the computer processor is further configured to execute the instructions to:

receive the memory releasable message sent by the sub-operating system;

return a memory release message to the sub-operating system according to the memory releasable message;

receive memory area release information returned by the sub-operating system; and update the global free memory queue.

17. A communications system, wherein the communications system comprises:

a global memory management service subsystem; and at least one sub-operating system, wherein the sub-operating system configured to:

count a page replacement rate in a task scheduling period of a predetermined quantity of times, and a memory residence time ratio in a page replacement period;

calculate a memory pressure index according to the page replacement rate and the memory residence time ratio; and send an application to a global memory management service module to allocate currently acquirable memory from global sharing memory when the memory pressure index is greater than a memory pressure threshold, and wherein the global memory management service subsystem is configured to:

receive the application that is used for allocating the currently acquirable memory from the global sharing memory and is sent by the sub-operating system;

mark an allocatable memory block in a global free memory queue as an unavailable state;

send a memory allocation message to the sub-operating system, wherein the memory allocation message carries a description message of the allocatable memory block;

receive an update confirmation message returned by the sub-operating system;

delete, according to the update confirmation message, the memory allocatable block that is marked as the unavailable state from the global free memory queue; and send a message in response to the update confirmation message to the sub-operating system.

* * * * *

UNITED STATES PATENT AND TRADEMARK OFFICE
CERTIFICATE OF CORRECTION

PATENT NO. : 9,652,150 B2
APPLICATION NO. : 14/739497
DATED : May 16, 2017
INVENTOR(S) : C. Tan et al.

Page 1 of 1

It is certified that error appears in the above-identified patent and that said Letters Patent is hereby corrected as shown below:

In the Claims

Column 20, Line 5, Claim 3 should read:
wherein a and b are ratio adjustment parmeters of the Column 24, Line 2, Claim 17 should read:
wherein the sub-operating system is configured to:

Signed and Sealed this
Eighteenth Day of July, 2017

Joseph Matal
*Performing the Functions and Duties of the*
*Under Secretary of Commerce for Intellectual Property and*
*Director of the United States Patent and Trademark Office*